(12) United States Patent
Lu et al.

(10) Patent No.: US 10,452,694 B2
(45) Date of Patent: *Oct. 22, 2019

(54) INFORMATION EXTRACTION FROM QUESTION AND ANSWER WEBSITES

(71) Applicant: Google LLC, Mountain View, CA (US)

(72) Inventors: Wei Lwun Lu, San Jose, CA (US); Denis Savenkov, Atlanta, GA (US); Amarnag Subramanya, Sunnyvale, CA (US); Jeffrey Dalton, San Mateo, CA (US); Evgeniy Gabrilovich, Saratoga, CA (US); Eugene Agichtein, Atlanta, GA (US)

(73) Assignee: Google LLC, Mountain View, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/849,212

(22) Filed: Dec. 20, 2017

(65) Prior Publication Data
US 2018/0150468 A1      May 31, 2018

Related U.S. Application Data

(63) Continuation of application No. 14/667,792, filed on Mar. 25, 2015, now Pat. No. 9,875,296.

(51) Int. Cl.
*G06F 17/00* (2019.01)
*G06F 16/332* (2019.01)
*G06F 17/27* (2006.01)

(52) U.S. Cl.
CPC ...... *G06F 16/3322* (2019.01); *G06F 17/2705* (2013.01); *G06F 17/2785* (2013.01)

(58) Field of Classification Search
CPC ..... G06N 5/022; G06F 17/277; G06F 17/278; G06F 17/2785
(Continued)

(56) References Cited

U.S. PATENT DOCUMENTS 6,901,394 B2    5/2005  Chauhan
7,873,624 B2    1/2011  Agichtein
(Continued)

OTHER PUBLICATIONS

Mintz et al., "Distant supervision for relation extraction without labeled data," Proceedings of the 47th Annual Meeting of the ACL and the 4th IJCNLP of the AFNLP, pp. 1003-1011, Aug. 2009.
(Continued)

*Primary Examiner* — Daniel Abebe
(74) *Attorney, Agent, or Firm* — Fish & Richardson P.C.

(57) ABSTRACT

Methods, systems, and apparatus for obtaining a resource, identifying a first portion of text of the resource that is characterized as a question, and a second part of text of the resource that is characterized as an answer to the question, identifying an entity that is referenced by one or more terms of the text that is characterized as the question, a relationship type that is referenced by one or more other terms of the text that is characterized as the question, and an entity that is referenced by the text that is characterized as the answer to the question, and adjusting a score for a relationship of the relationship type for the entity that is referenced by the one or more terms of the text that is characterized as the question and the entity that is referenced by the text that is characterized as the answer to the question.

20 Claims, 4 Drawing Sheets

(58) Field of Classification Search
USPC .......................................................... 706/45
See application file for complete search history.

(56) References Cited

U.S. PATENT DOCUMENTS

| | | | |
|---|---|---|---|
| 7,877,343 | B2 | 1/2011 | Cafarella |
| 8,560,567 | B2* | 10/2013 | Azzam ................ G06F 16/3329 707/769 |
| 8,819,006 | B1 | 8/2014 | Chechik et al. |
| 8,832,064 | B2 | 9/2014 | Stenchikova |
| 2006/0167689 | A1 | 7/2006 | Maren |
| 2009/0162824 | A1* | 6/2009 | Heck ....................... G06N 3/004 434/322 |
| 2011/0125734 | A1 | 5/2011 | Duboue |
| 2011/0307435 | A1 | 12/2011 | Overell |
| 2015/0186534 | A1 | 7/2015 | Chechik et al. |
| 2016/0171373 | A1 | 6/2016 | Allen et al. |

OTHER PUBLICATIONS

Wu and Weld, "Open Information Extraction using Wikipedia," ACL '10 Proceedings of the 48th Annual Meeting of the Association for Computational Linguistics, pp. 118-127, Jul. 2010.

\* cited by examiner

INFORMATION EXTRACTION FROM QUESTION AND ANSWER WEBSITES

RELATED APPLICATIONS

This application is a continuation of U.S. application Ser. No. 14/667,792, filed Mar. 25, 2015, the contents of which is hereby incorporated by reference.

TECHNICAL FIELD

This specification relates to search engines, and one particular implementation relates to extracting information from webpages or other web-based resources.

BACKGROUND

In general, a question and answer (Q&A) website can enable a user to solicit answers to a question. The Q&A website can include a webpage that includes both the question submitted by the user, as well as an answer to the question that has been submitted by another user of the Q&A website or an answer to the question that has been provided by other sources.

SUMMARY

A webpage of a Q&A website can be used as a resource to determine relationships between entities that are identified by the question and answer presented at the webpage. For example, a computer system selects a webpage from a Q&A website that includes the question, "Who is Barack Obama married to?" as well as the answer, "Michelle Obama." A computer system analyzes the webpage from the Q&A website to distinguish the portions of the webpage text that represent the question and the answer from other text on the webpage, such as advertisements, menus, headers, or other text.

A relationship type is determined based on the question text, for example, by determining that the terms "married to" in the question text likely indicate a spousal relationship between an entity indicated in the question text and an entity indicated in the answer text. Entities are also identified from the question text and the answer text. For example, the computer system can identify the entity "Barack Obama" from the question text, and the entity "Michelle Obama" from the answer text.

Having identified a relationship type and the two entities identified by the question and answer text, a candidate relationship is determined. For example, the determined candidate relationship may be a spousal relationship between the entities "Barack Obama" and "Michelle Obama."

A similar process is repeated for a corpus of webpages from Q&A websites to generate a set of candidate relationships of a particular relationship type for a particular entity. For example, after processing a corpus of webpages from Q&A websites, the computer system can determine that the entity "Barack Obama" has a spousal relationship with one of the entities "Michelle Obama," "Hillary Clinton," or "Laura Bush."

To determine which of these candidate relationships is most likely accurate, the computer system aggregates the candidate relationships of the particular relationship type for the particular entity, and scores each of the candidate relationships. For example, the computer system scores each of the candidate relationships based at least on the frequency with which the candidate relationship was determined from webpages of Q&A websites.

The candidate relationship having the highest score is selected as the most likely valid relationship for the particular relationship type and entity. For example, based on determining that the candidate spousal relationship between "Barack Obama" and "Michelle Obama" is the most frequently occurring spousal relationship for the entity "Barack Obama," the computer system determines that a spousal relationship exists between "Barack Obama" and "Michelle Obama." The computer system can then establish, in an entity relationship model, a spousal relationship between the entity "Barack Obama" and the entity "Michelle Obama."

Innovative aspects of the subject matter described in this specification may be embodied in methods that include the actions of obtaining a resource, identifying a first portion of text of the resource that is characterized as a question, and a second part of text of the resource that is characterized as an answer to the question, identifying an entity that is referenced by one or more terms of the first portion of text that is characterized as the question, a relationship type that is referenced by one or more other terms of the first portion of the text that is characterized as the question, and an entity that is referenced by the second portion of text that is characterized as the answer to the question, and adjusting a score associated with a relationship of the relationship type for the entity that is referenced by the one or more terms of the first portion of text that is characterized as the question and the entity that is referenced by the second portion of text that is characterized as the answer to the question.

Other embodiments of these aspects include corresponding systems, apparatus, and computer programs, configured to perform the actions of the methods, encoded on computer storage devices.

These and other embodiments may each optionally include one or more of the following features. In various examples, the resource is a question and answer (Q&A) website resource. Identifying the relationship type that is referenced by the one or more other terms of the first portion of the text that is characterized as the question comprises comparing the first portion of the text that is characterized as the question to one or more templates, each template being associated with a particular relationship type, determining that the first portion of the text that is characterized as the question matches a particular template from among the one or more templates, and identifying, as the relationship type that is referenced by the one or more other terms of the first portion of the text that is characterized as the question, a relationship type that is associated with the particular template. Each of the one or more templates is one of a surface-based template or a parser-based template. The actions comprise aggregating the score associated with the relationship of the relationship type for the entity that is referenced by the one or more terms of the first portion of text that is characterized as the question and the entity that is referenced by the second portion of text that is characterized as the answer to the question and one or more other scores that are each associated with the relationship of the relationship type for the entity that is referenced by the one or more other terms of the first portion of text that is characterized as the question and an entity that is referenced by a portion of text that is characterized as an answer to the question, comparing the score associated with the relationship of the relationship type for the entity that is referenced by the one or more terms of the first portion of text that is characterized as the question and the entity that is referenced by the second portion of text that is characterized as the answer to the question and the one or more other scores that are each associated with the relationship of the relationship type for the entity that is referenced by the one or more other terms of the first portion of text that is characterized as the question and an entity that is referenced by a portion of text that is characterized as an answer to the question, and establishing, at an entity relationship model and based at least on the comparison, a relationship of the relationship type between the entity that is referenced by the one or more terms of the first portion of text that is characterized as the question and the entity that is referenced by the second portion of text that is characterized as the answer to the question. Identifying the entity that is referenced by the second portion of text that is characterized as the answer to the question comprises determining an entity class for the entity that is referenced by the one or more terms of the first portion of text that is characterized as the question, determining a target entity class based on the entity class for the entity that is referenced by the one or more terms of the first portion of text that is characterized as the question, and the relationship type that is referenced by the one or more terms of the first portion of text that is characterized as the question, and the relationship type that is referenced by the one or more other terms of the first portion of the text that is characterized as the question, and identifying, as the entity that is referenced by the second portion of text that is characterized as the answer to the question, and entity that is referenced by the second portion of text that is characterized as the question, and matches the target entity class. Identifying the first portion of text of the resource that is characterized as the question, and the second portion of text of the resource that is characterized as the answer to the question comprises submitting the resource to a machine-learnt classifier that is configured to identify portions of text that are characterized as questions in Q&A website resources and portions of text that are characterized as answers in Q&A website resources, and receiving, from the machine-learnt classifier, information that identifies the first portion of text of the resource that is characterized as the question, and the second portion of text of the resource that is characterized as the answer to the question.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
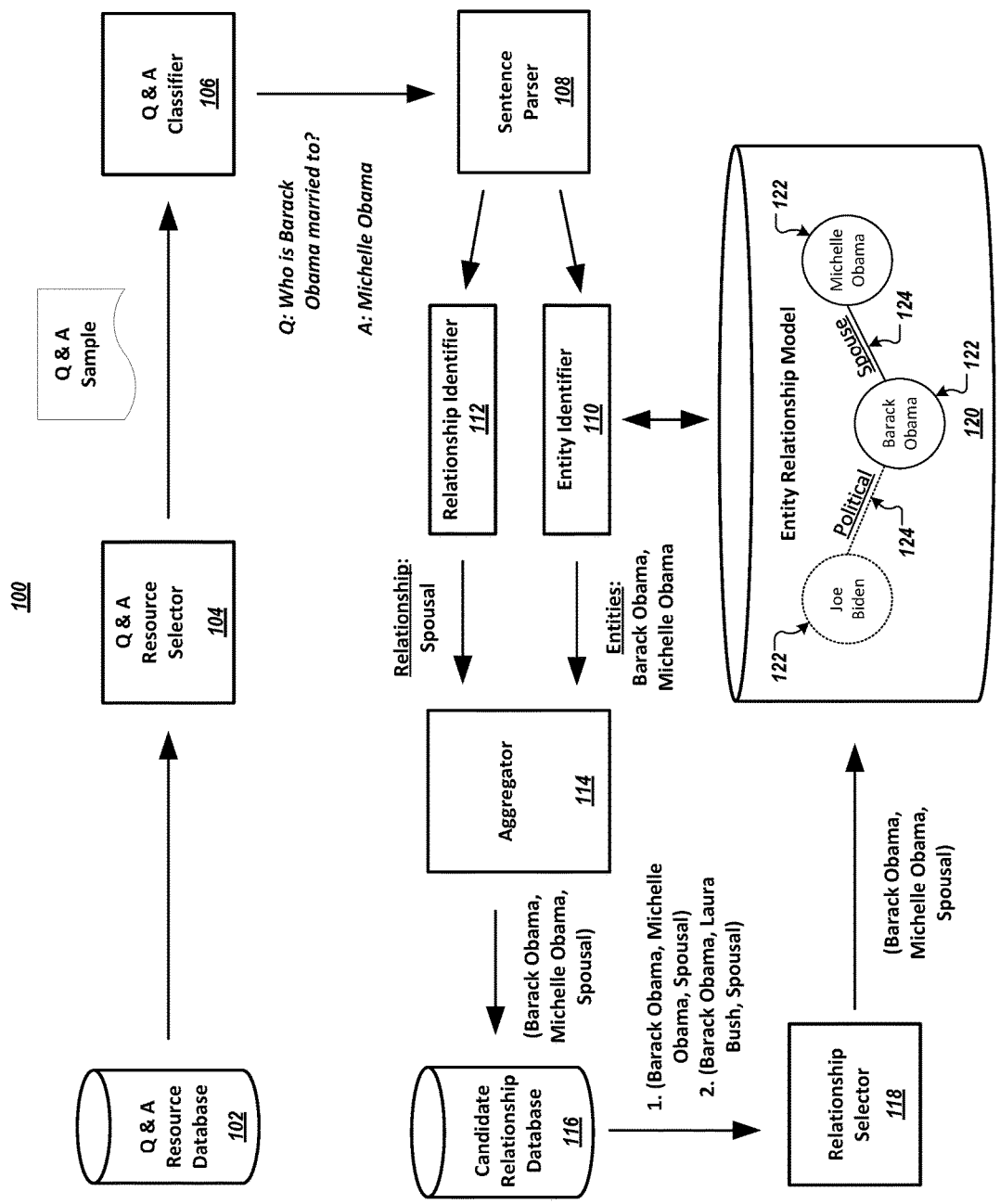
FIG. 1 depicts an example system for extracting entity relationships from question and answer (Q&A) websites.

FIG. 1 depicts an example system 100 for extracting entity relationships from Q&A website resources. In general, the system 100 extracts relationships between entities from resources, such as webpages, hosted by Q&A websites. The system 100 includes an entity relationship model that specifies the relationships that are determined from the Q&A website resources.

In some implementations, the system 100 accesses a corpus of Q&A website resources. For each of a number of Q&A website resources, the system 100 identifies a portion of text that represents a question and another portion of text from the resource that represents an answer to the question. A particular entity and a particular relationship type are determined from the question text, and another entity is determined from the answer text. The pair of entities and the identified relationship type represent a candidate relationship of the identified relationship type between the entity identified in the question text and the entity identified in the answer text.

The system 100 aggregates candidate relationships of the particular relationship type for the entity determined from the question text. From the aggregate set of candidate relationships, the system 100 selects a particular candidate relationship as the most likely valid relationship of the particular relationship type for the entity determined from the question text. The system 100 selects this particular candidate relationship as being valid based on scores assigned to each of the candidate relationships that indicates, for example, the number of Q&A website resources processed by the system 100 that produced the same candidate relationship.

The system 100 establishes a relationship of the particular relationship type between the entity determined from the question text and the entity determined from the answer text that is associated with the most likely valid candidate relationship. This relationship is established by the system 100 in the entity relationship model.

Briefly, the system 100 includes a Q&A resource database 102, a Q&A resource selector 104, a Q&A classifier 106, a sentence parser 108, an entity identifier 110, a relationship identifier 112, an aggregator 114, a database of candidate relationships 116, a relationship selector 118, and an entity relationship model 120. Entities represented in the entity relationship model 120 may be represented as nodes 122, with relationships between entities being represented as edges 124.

To extract entity relationships from Q&A website resources, the system 100 accesses the Q&A resource database 102 that includes multiple resources from Q&A websites. For example, resources accessible at the Q&A resource database 102 can include a number of webpages from Q&A websites, such as archived versions of the webpages from Q&A websites, can include metadata relating to webpages of Q&A websites, documents accessible at Q&A websites, images accessible at Q&A websites, videos accessible at Q&A websites, audio accessible at Q&A websites, or other resources associated with or accessible at Q&A websites. In some implementations, the Q&A resource database 102 can be a resource database that includes resources from sources other than Q&A websites. For example, the Q&A resource database 102 can include one or more resources from forum websites, social network platforms, frequently asked questions (FAQ) websites or FAQ webpages, informational websites, or other sources where questions and answers are available.

The Q&A resource selector 104 accesses the Q&A resource database 102 and selects a particular resource from among the corpus of resources stored at the Q&A resource database 102. For example, the Q&A resource selector 104 may access the Q&A resource database 102 and select a particular webpage hosted by a Q&A website. The system 100 then extracts a candidate relationship from particular webpage.

A webpage from a Q&A website typically includes a portion of text that corresponds to a question and a portion of text that corresponds an answer to the question, where the question text and the answer text may occur in different sentences within text of the webpage, or within different regions of the webpage. For example, a webpage selected by the Q&A resource selector 104 may display text corresponding to a question in a first region of the webpage, and may display text corresponding to an answer to the question in a second region of the webpage, such that the question text and answer text occur in two different regions of the webpage.

To identify the question text and the answer text from the resource selected by the Q&A resource selector 104, the resource is provided to and processed by the Q&A classifier 106. The Q&A classifier processes the resource selected from the Q&A resource database 102 to identify text in the resource that likely corresponds to a question, and to identify other text in the resource that likely corresponds to an answer to the question. In some examples, the Q&A classifier 106 can identify the question and answer text based on detecting the presence of one or more textual templates or triggers that indicate that the text likely corresponds to a question or an answer.

For example, the Q&A classifier 106 may parse the text of the resource and identify question or answer text based on the presence of certain characters or strings of characters, such as a question mark. The Q&A classifier 106 may parse the text of the resource for words or phrases that are indicative of question text, such as the words and phrases "I was wondering," "I am asking," "question," "who," "what," "where," "when," "why," "how," etc. The Q&A classifier 106 may similarly parse the text of the resource for words or phrases that are indicative of answer text, such as the words and phrases "I know," "I believe," "I think," "The answer is," "answer," etc.

In other examples, the Q&A classifier 106 can determine the portions of text representing the question and answer using other mechanisms, for example, by identifying a portion of text that is likely a question, and identifying another portion of text that appears subsequent to the question text in the resource as the answer text. The Q&A classifier 106 can identify question or answer texts by locating text that appears in a region of a Q&A website resource that typically corresponds to a question or answer. In some implementations, the Q&A classifier 106 can identify question text or answer text by identifying portions of text that each include a particular segment of text or sequence of words, or portions of text that include terms that are also included in text that has been identified as likely question text or answer text, regardless of the ordering of those terms in the different texts.

In still other implementations, the Q&A classifier 106 can identify answer text by locating short sentences or short segments of text in the resource, e.g., the text "Michelle Obama." The Q&A classifier 106 may identify answer text as text that refers only to a single entity, e.g., the entity "Michelle Obama." Other techniques may be employed for locating the portions of text corresponding to the question and the answer in the resource selected by the Q&A resource selector 104.

In the example shown in FIG. 1, the Q&A resource selector 104 selects a particular sample resource from among the resources stored at the Q&A resource database 102, and identifies a first portion of text that corresponds to a question, and a second portion of text that corresponds to an answer to that question. As shown, the question text identified by the Q&A classifier 106 recites "Who is Barack Obama married to?" and the answer text identified by the Q&A classifier 106 recites "Michelle Obama."

The Q&A classifier 106 provides the text portion corresponding to the question and the text portion corresponding to the answer to the sentence parser 108. In some implementations, the question and answer texts are transmitted to the sentence parser 108 as text that has not been modified from the text selected by the Q&A classifier 106 from the resource. In other implementations, the question or answer texts transmitted to the sentence parser 108 are revised or cleaned up versions of the text selected from the resource.

The sentence parser 108 receives the question text and the answer text, and processes the question and answer texts to annotate the question and answer texts. In some implementations, annotating the question and answer texts involves identifying the grammatical unit types of terms and/or sequences of terms in the question and answer texts. For example, the sentence parser 108 can identify nouns, verbs, subjects, predicates, objects, prepositions, adjectives, adverbs, or other grammatical units from the question and answer texts, e.g., any combination of morphemes, words, phrases, clauses, or sentences in the question and answer texts.

Based on identifying the grammatical unit type of the various terms or sequences of terms in the question and answer texts, the sentence parser 108 annotates the various terms and sequences of terms of the question and answer text with their identified grammatical unit types. Additionally or alternatively, the sentence parser 108 generates a parse tree of the question and answer texts, where the parse tree of each of the question and answer texts represents the syntactic structure of the question or answer text.

Additionally, in some implementations, the sentence parser 108 may identify a class or hypernym associated with one or more of the grammatical units detected in the question or answer text, and may annotate the grammatical units detected in the question or answer text with the class or hypernym. For example, a term that is identified as a noun in a portion of question text may be further identified as being a "person," a "place," or a "thing," and the sentence parser 108 can annotate the term as being a noun belonging to the particular "person," "place," or "thing" class. The sentence parser 108 may be able to annotate the question and answer texts based on having access to one or more dictionaries or other resources that are configured to perform or aid in performing natural language processing (NLP).

As an example, the sentence parser 108 may receive the question text, "Who is Barack Obama married to?" and may annotate the question text as "WHO/pronoun IS/verb BARACK OBAMA/noun MARRIED/adjective TO/verb?" Similarly, the sentence parser may receive the answer text "Michelle Obama" and may annotate the answer text as "MICHELLE OBAMA/noun." The sentence parser may further determine a class or hypernym of one or more grammatical units in the annotated texts, for example, to determine that the terms "Barack Obama" constitute a "person" noun class, and that the terms "Michelle Obama" also constitute a "person" noun class.

Having parsed the question and answer texts, the sentence parser 108 provides the annotated question and answer texts to the entity identifier 110 and relationship identifier 112. In alternate implementations, the question text and/or answer text may be provided to the entity identifier 110 and relationship identifier 112 without processing by the sentence parser 108. In such implementations, the entity identifier 110 and/or relationship identifier 112 may perform operations similar to those performed by the sentence parser 108, or may identify entities or relationships from the question text and/or answer text without the question text or answer text being annotated. In such instances, the Q&A classifier 106 can provide the question and answer texts to the entity identifier 110 and relationship identifier 112.

The entity identifier 110 and the relationship identifier 112 receive the question text and/or answer text to identify a relationship type and a pair of entities referenced by the question text and answer text. In some implementations, only the question text is provided to the relationship identifier 112, while both the question text and answer text are provided to the entity identifier 110. In other implementations, both the question text and the answer text are provided to each of the entity identifier 110 and the relationship identifier 112.

The entity identifier 110 and the relationship identifier 112 can receive question text and/or answer text that have not been annotated from the Q&A classifier 106, or can receive annotated question and/or answer texts from the sentence parser 108. Using the question text and/or answer text, the entity identifier 110 identifies entities that are specified by the question text and the answer text as entities that may share some type of relationship. The relationship identifier 112 uses the question text and/or answer text to determine a relationship type, where the relationship type indicates a potential type of relationship between the entities identified by the entity identifier 110.

In some implementations, the entity identifier 110 receives the annotated question text and annotated answer text, and identifies an entity in each of the question text and the answer text. For example, given the question text corresponding to the question, "Who is Barack Obama married to?" the entity identifier 110 can identify the entity "Barack Obama." Similarly, given the answer text corresponding to the answer "Michelle Obama," the entity identifier 110 can identify the entity "Michelle Obama."

In some implementations, the entity identifier 110 can have access to the entity relationship model 120, and can identify entities from the question and answer texts that are included in the entity relationship model 120. In such an implementation, the entity identifier 110 may only be capable of identifying entities from question and answer texts that are represented in the entity relationship model 120. Additionally or alternatively, the entity identifier 110 may have access to one or more databases or other resources that identify entities, such as one or more databases or resources that are accessible over one or more networks. In such implementations, the entity identifier 110 may be capable of identifying from the question and answer texts those entities that are included in the one or more databases.

In some implementations, the entity identifier 110 may identify a new entity that is not already represented in the entity relationship model 120 or the one or more other databases or resources. For example, the entity identifier may attempt to match the terms "Michelle Obama" to entities represented in the entity relationship model 120 and may determine that there are not any entities represented in the entity relationship model 120 that are named "Michelle Obama."

Based on determining that the identified entity is new, the entity identifier 110 may add a new entity to the entity relationship model 120 or the one or more other databases or resources to add the newly identified entity. For example, based on the entity identifier 110 failing to identify an entity named "Michelle Obama" in the entity relationship model 120, the entity identifier 110 can provide information to the entity relationship model 120 that creates an entity node 122 representing the entity "Michelle Obama."

In some implementations, the entity identifier 110 identifies entities by comparing terms of question text or answer text to entities identified in the entity relationship model 120 or identified in another database or resource. For example, the entity identifier 110 that has access to the entity relationship model 120 may compare terms of the question, "Who is Barack Obama married to?" to entities included in the entity relationship model 120 to identify the entity "Barack Obama."

Additionally or alternatively, the entity identifier 110 may compare one or more grammatical units of annotated question text and/or answer text to the entities identified in the entity relationship model 120 to identify potentially related entities. For example, the sentence parser 108 may annotate the question text "Who is Barack Obama married to?" to the form "WHO/pronoun IS/verb BARACK OBAMA/noun MARRIED/adjective TO/verb?" Thus, the entity identifier 110 may compare the noun "Barack Obama" to the entities represented in the entity relationship model 120 to identify an entity named "Barack Obama."

In still other implementations, the entity identifier 110 may only compare a particular grammatical unit, such as the noun "Barack Obama" to other entities that are identified as being of the same class. For example, based on determining that the noun "Barack Obama" is of a "person" noun class, the entity identifier 110 may only compare the noun "Barack Obama" to entities in the entity relationship model 120 that are of the "person" noun class, and may not compare the noun "Barack Obama" to other entities in the entity relationship model 120 that are not of the "person" noun class, e.g., that are of a "place" or "thing" class.

In some implementations, the entity identifier 110 may identify two or more entities from one of the question text or the answer text. In such instances, the entity identifier 110 may select the potentially related entities based on a class determined for each of the identified entities, based on a particular relationship type determined by the relationship identifier 112, or based on other factors.

For example, the entity identifier 110 may receive the question text "Who is Barack Obama married to?" and identify the entity "Barack Obama," and may receive the answer text "He lives with his wife Michelle Obama at the White House" and identify the entities "Michelle Obama" and "White House." The entity identifier 110 may determine that the entities "Barack Obama" and "Michelle Obama" are each of a "person" noun class, and that the entity "White House" is of a "place" noun class. The entity identifier 110 may select the entities "Barack Obama" and "Michelle Obama" as potentially related entities based on both entities being of the "person" noun class, and therefore being more likely to be related in some way than a particular person is to be related to a particular place.

Alternatively, the entity identifier 110 may select the potentially related entities based on a relationship type determined by the relationship identifier 112. For example, based on the relationship identifier 112 identifying a spousal relationship type from the question text, the entity identifier 110 may select the entities "Barack Obama" and "Michelle Obama," since they both are of the "person" noun class and are therefore more likely to be entities that have a spousal relationship than are entities of different classes or entities of a "place" or "thing" class. However, in another example, if the relationship identifier 112 determined a "residence" relationship type, the entity relationship engine 110 may identify "Barack Obama" and "White House" as the related entities, since the entity "Barack Obama" of a "person" noun class is most likely to have a residence relationship with a "place" noun class.

The relationship identifier 112 also receives the annotated question text and/or the annotated answer text from the sentence parser 108, and identifies a relationship type for the candidate relationship between the entities identified by the entity identifier 110 based on the annotated question text and/or annotated answer text. To determine a relationship type, the relationship identifier 112 may employ one of a template-based extractor or a classifier-based extractor, for example, a maximum entropy-based extractor. Discussed briefly here, the template-based extractor is discussed in additional detail at FIG. 2A, and the classifier-based extractor is discussed in additional detail at FIG. 2B.

In some implementations, the relationship identifier 112 has access to one or more databases or other resources that store templates that are each associated with a particular relationship type. The relationship identifier 112 may utilize a template-based extractor to determine a relationship type from the question text received from the sentence parser 108 or Q&A classifier 106. Various relationship types may be acknowledged by the relationship identifier 112, including spousal relationships, familial relationships, political relationships, business relationships, ownership relationships, residence relationships, birth place relationships, employee/employer relationships, occupational relationships, or other relationships between people, places, or things.

For example, the relationship identifier 112 may determine relationships between particular entities and numerical values or dates. Such numerical values may include, for instance, a relationship between a person and a particular numerical value, such as the person's age, net worth, jersey number, height, etc. Similarly, dates may be associated with a particular person, such as a date of birth, marriage date, date of death, etc. Numerical values and dates may be associated with other entity classes. For example, a company entity may be associated with a date of founding, a city with a population size, etc.

The relationship identifier 112 includes a matcher that determines whether a match exists between particular question text and a particular template accessible by the relationship identifier 112. For example, the relationship identifier 112 can compare the question text "Who is Barack Obama married to?" and determine that it matches a template of the form "Who is [PERSON] married to?" that is associated with a spousal relationship type. Based on determining the match between the question text and the particular template, the relationship identifier 112 can select, as the relationship type represented by the question text, the particular relationship type that is associated with the matched template.

The relationship identifier 112 may be capable of accessing two different types of templates, including surface-based templates and parser-based templates. Surface-based templates correspond to question text that has not been annotated and include placeholders that are fillable with other terms from question text, e.g., terms representing entities identified by the entity identifier 110. For example, the template "Who is [PERSON] married to?" may be associated with a spousal relationship type.

To determine that particular question text matches the template, the relationship identifier 112 may compare the question text to the template to determine if the question text matches the template. For example, the relationship identifier 112 may compare the question text "Who is Barack Obama married to?" to the template "Who is [PERSON] married to?" and determine that the question text matches the template. Based on determining that the question text matches the template, the relationship identified can select a spousal relationship type as the type of candidate relationship between the entities identified by the entity identifier 110.

In some implementations, determining that question text matches a template requires that an entity identified by the entity identifier 110 be of a particular entity class that is specified by the template. For example, the relationship identifier 112 may determine that the question text, "Who is Barack Obama married to?" matches the template "Who is [PERSON] married to?" only if the question text matches the template and the entity "Barack Obama" identified by the entity identifier 110 is of the "person" class specified by the template. Thus, while comparing the question text "Who is Barack Obama married to?" to the template "Who is [PERSON] married to?" may result in the relationship identifier 112 determining a spousal relationship type, comparing the question text "Who is America married to?" to the template would not result in the relationship identifier 112 determining a spousal relationship type if the entity identifier 110 identifies the entity "America" as being of the "place" class.

Additionally or alternatively, the relationship identifier 112 may identify certain terms or characters in question text as stop words or punctuation, and may ignore those terms or characters when determining whether the question text matches a template. For example, the question text "Who is Barack Obama married to?" may be determined as matching the template "who [PERSON] married to" based at least on the relationship identifier 112 ignoring the stop word "is" and the question mark that appear in the question text when comparing the question text and the template.

In other implementations, the relationship identifier 112 determines a relationship type from question text by comparing annotated question text to one or more parser-based templates. In this implementation, the relationship identifier 112 compares parser-based templates to the annotated question text received from the sentence parser 108 in determining a relationship type for the candidate relationship between the entities identified by the entity identifier 110.

For example, the question text "Who is Barack Obama married to?" that is annotated as "WHO/pronoun IS/verb BARACK OBAMA/noun MARRIED/adjective TO/verb?" may be determined as matching the parser-based template "[PERSON]/pronoun IS/verb [PERSON]/noun MARRIED/adjective TO/verb" that is associated with a spousal relationship type. Based on determining that the annotated question text matches the parser-based template, and optionally determining that the entity "Barack Obama" is of the "person" class specified by the parser-based template, the relationship identifier 112 can determine a spousal relationship type for the potential relationship between the entities identified by the entity identifier 110.

While the embodiments discussed thus far compare surface-based templates or parser-based templates with question text to determine a relationship type, in some implementations the surface-based templates or parser-based templates may be compared with answer text to determine a relationship type. In some implementations, the answer text may be compared to surface-based or parser-based templates only after determining that none of the surface-based templates or parser-based templates match the question text.

Additionally or alternatively, in some instances, surface-based templates or parser-based templates may be specific to one of question text or answer text, such that template that is directed to detecting relationship types from question text is not compared with answer text, and vice versa. In some implementations, both question text and answer text are compared with one or more surface-based templates or parser-based templates to determine a relationship type, for example, to help increase the accuracy of the determination.

In other implementations, the relationship identifier 112 utilizes a classifier-based extractor to determine a relationship type from question text and/or answer text, for example, a maximum entropy-based extractor. The classifier-based extractor makes a probabilistic estimate of a candidate relationship between two entities based on a combination of signals or information from multiple sources. For instance, a maximum entropy-based extractor may consider multiple factors in determining whether question text and/or answer text identifies a particular relationship type.

For example, the classifier-based extractor may consider whether the question text and/or answer text matches a particular surface-based template or parser-based template, and if so which template or templates the question text and/or answer text matches, may consider the classes of entities identified by the entity identifier 110, may consider a parse from a HEAD token identified in the question text to an entity identified from the question text by the entity identifier 110, may consider a parse path from a HEAD token identified in the answer text to an entity identified from the answer text by the entity identifier 110, may consider words that appear adjacent to the entities identified from the question text or answer text, may compute and/or consider a similarity measure that is determined for the pair of the question text and a template or answer text and a template, or may consider other factors in determining the probabilistic estimate of the relationship type.

After determining the various factors or information, the classifier-based extractor evaluates the factors or information to determine one or more probabilities that each indicate the probability that the question text and/or answer text relates to a particular relationship type. The classifier-based extractor selects the relationship type having the highest estimated probability as the relationship type specified by the resource. This is in contrast to the template-based extractor, which identifies a particular relationship type based on a binary determination, i.e., based on determining that the question text does or does not match a particular template, without providing a probability of the accuracy of the determined relationship type.

Based on the entity identifier 110 having identified a pair of potentially related entities from the question text and answer text and the relationship identifier 112 having identified a particular type of candidate relationship between the entities, information identifying the candidate relationship between the pair of entities is provided to the aggregator 114. For example, based on identifying the entity "Barack Obama" from question text and the entity "Michelle Obama" from answer text, and further determining that a relationship between the two entities may be a spousal relationship, e.g., based on the question text matching a template associated with a spousal relationship type, the aggregator 114 receives information from the entity identifier 110 and relationship identifier 112 that specifies the entities and the relationship type.

The aggregator 114 adds the candidate relationship to a set of candidate relationships of the particular relationship type for the entity identified from the question text. For example, the aggregator 114 can add the candidate spousal relationship between the entity "Barack Obama" and the entity "Michelle Obama" to a set of candidate spousal relationship for the entity "Barack Obama." The set of candidate relationships is stored at the candidate relationships database 116. For example, as shown in FIG. 1, the candidate relationships database 116 may include multiple candidate spousal relationships for the entity "Barack Obama," including the candidate spousal relationship between "Barack Obama" and the entity "Michelle Obama," and the candidate spousal relationship between "Barack Obama" and the entity "Laura Bush."

In some implementations, the system 100 processes multiple resources accessible at the Q&A resource database 102 to identify candidate relationships between entities, and the aggregator 114 adds each of these candidate relationships to the candidate relationships database 116. For example, in connection with the processing of multiple resources, the aggregator 114 can receive information specifying multiple candidate relationships from the entity identifier 110 and relationship identifier 112, where each candidate relationship indicates the same relationship type between a particular entity and another entity, e.g., multiple candidate spousal relationships between the entity "Barack Obama" and one or more different entities. The aggregator 114 can add each of these candidate relationships to a set of candidate relationships of the particular relationship type for the particular entity at the candidate relationships database 116.

The candidate relationships database 116 can include one or more databases or other data storage units that are accessible by the aggregator 114 over one or more networks, or over one or more wired or wireless connections. In some implementations, the aggregator 114 receives information from the entity identifier 110 that identifies a pair of entities, and receives information from the relationship identifier 112 that identifies a relationship type for a candidate relationship between the pair of entities identified by the entity identifier 110. The aggregator 114 can combine the information received from the entity identifier 110 and the relationship identifier 112 to create a candidate relationship that the aggregator 114 can then store at the candidate relationship database 16. For example, the aggregator 114 can create an entry at the candidate relationship database 16 that identifies the pair of entities, e.g., "Barack Obama" and "Michelle Obama," and the relationship type, e.g., a spousal relationship type.

In some implementations, the candidate relationship database 116 receives the data specifying the candidate relationship from the aggregator 114, and adds the candidate relationship to a set of candidate relationships stored at the candidate relationship database 116. In some implementations, the candidate relationship database 116 stores sets of candidate relationships for one or more different entities, and/or for one or more different relationship types for those entities. For example, the candidate relationship database 116 can store a set of candidate relationships for each of the entities "Barack Obama" and "Joe Biden." The candidate relationship database 116 can also store a set of candidate relationships of one or more different relationship types for each of those entities. For example, entity "Barack Obama" can be associated with a set of candidate relationships of a spousal relationship type, a set of candidate relationships of a political relationship type, a set of candidate relationships of a residence relationship type, etc.

Each set of candidate relationships of a particular relationship type for a particular entity can include one or more candidate relationships. For example, the candidate relationship database 116 can store candidate spousal relationships for the entity "Barack Obama" that include a candidate spousal relationship to the entity "Michelle Obama," and a candidate spousal relationship to the entity "Laura Bush."

In some implementations, the candidate relationship database 116 can store duplicates of particular candidate relationships of a particular relationship type between specific entities, or can maintain a counter of the number of times the candidate relationship database 116 has received information from the aggregator 114 specifying the particular candidate relationship of the particular relationship type between the specific entities. For example, the candidate relationship database 116 can store multiple entries that specify a candidate spousal relationship exists between "Barack Obama" and "Michelle Obama." Alternatively, the candidate relationship database 116 can store a single entry for the candidate spousal relationship between the entities "Barack Obama" and "Michelle Obama," and can also store information indicating the number of times that the candidate relationship database 116 has received information from the aggregator 114 specifying that particular candidate relationship.

The candidate relationship database 116 includes candidate relationships that are each determined from a particular resource stored in the Q&A resource database 102. For example, for each resource in the Q&A resource database 102 that is processed by the system 100, the system 100 can determine a candidate relationship and can store the candidate relationship at the candidate relationship database 116. Since the system 100 may determine different candidate relationships of a particular relationship type for different resources, the candidate relationship database 116 may different candidate relationships of the particular relationship type for the particular entity.

For example, based on processing a resource that includes the question text "Who is Barack Obama married to?" and the answer text "Michelle Obama," the system 100 may determine that a candidate spousal relationship exists between the entity "Barack Obama" and the entity "Michelle Obama" and may store that candidate relationship at the candidate relationship database 116. Additionally, based on processing a resource that includes the question text "Who did Barack Obama marry?" and the answer text "He married me," the system 100 may determine that another candidate spousal relationship exists between the entity "Barack Obama" and the entity "me," and may also store that candidate relationship database 116. In this way, the candidate relationship database 116 may store a number of candidate relationships of a particular relationship type for a specific entity, e.g., candidate spousal relationships for the entity "Barack Obama."

The relationship selector 118 having access to the candidate relationship database 116 can access one or more candidate relationships of a particular relationship type for a specific entity, and can select a particular candidate relationship as the relationship of the particular relationship type for the specific entity that is most likely to be valid. For example, the relationship selector 118 can access information specifying one or more candidate spousal relationships for the entity "Barack Obama," such as a first candidate spousal relationship between "Barack Obama" and "Michelle Obama," and a second candidate spousal relationship between "Barack Obama" and "Laura Bush." Based on accessing the candidate relationships of the particular relationship type for the particular entity, the relationship selector 118 determines a confidence measure for each of the candidate relationships, and selects the candidate relationship having the confidence measure that is indicative of the greatest confidence.

In some implementations, the relationship selector 118 considers a number of different factors in determining which candidate relationship is most likely to be a valid relationship of a particular relationship type between two entities. For example, the relationship selector 118 can access the information specifying the candidate relationships at the candidate relationship database 116, and may also access additional information relating to the candidate relationships. For example, the candidate selector 118 may access information indicating the number of resources processed by the system 100 that resulted in a particular candidate relationship being determined, e.g., the number of processed resources that suggest a spousal relationship between "Barack Obama" and "Michelle Obama," as well as the number of processed resources that suggest a spousal relationship between "Barack Obama" and "Laura Bush."

Additionally or alternatively, the candidate selector 118 may access information indicating the number of different templates that were matched by question text identified from different resources and that resulted in a particular candidate relationship being determined. For example, the system 100 may determine a candidate spousal relationship between the entities "Barack Obama" and "Michelle Obama" based on the question text "Who is Barack Obama married to?" from one resource matching the template "Who is [PERSON] married to?" and may also determine a candidate spousal relationship between the entities "Barack Obama" and "Michelle Obama" based on the question text "Who did Barack Obama marry?" extracted from another resource matching the template "Who did [PERSON] marry?"

The relationship selector 118 may additionally or alternatively consider the number of resources that identify the pair of entities for a particular relationship type. For example, the relationship selector 118 may determine a total number of resources that specify a candidate relationship between "Barack Obama" and "Michelle Obama," and may further determine the number of those resources that specify that the candidate relationship between the entities "Barack Obama" and "Michelle Obama" that are spousal relationships, as opposed to, for example, political relationships, sibling relationships, etc. Other factors or information may also be determined or obtained by the relationship selector 118, and used in determining a confidence measure for a particular candidate relationship.

The relationship selector 118 accesses the information relevant to determining the confidence measure for each candidate relationship, and provides the information to a classifier that predicts that probability of each candidate relationship being valid. For example, the classifier may be a machine-learnt classifier that predicts the probability of each candidate relationship being valid.

The relationship selector 118 then selects the particular candidate relationship having the highest confidence measure as the relationship of the particular relationship type for the particular entity identified from the question text. For example, based on determining a confidence measure for a spousal relationship between "Barack Obama" and "Michelle Obama" and determining a confidence measure for a spousal relationship between "Barack Obama" and "Laura Bush," the relationship selector 118 may determine that the confidence value for the candidate spousal relationship between "Barack Obama" and "Michelle Obama" is greater than the confidence value for the candidate spousal relationship between "Barack Obama" and "Laura Bush."

Based on this determination, the relationship selector 118 selects the candidate spousal relationship between "Barack Obama" and "Michelle Obama."

Based on selecting a particular candidate relationship, the relationship selector 118 provides information to the entity relationship model 120 that establishes a relationship in the entity relationship model 120 between the pair of entities specified in the selected candidate relationship. For example, the relationship selector 118 can provide information to the entity relationship model 120 that indicates that the entities "Barack Obama" and "Michelle Obama" are to be related by a spousal relationship type.

Based on receiving the information specifying the pair of related entities and the relationship type, the entity relationship model 120 establishes a relationship of the specified relationship type between the pair of entities. For example, the entity relationship model 120 receives the information specifying the entities "Barack Obama" and "Michelle Obama," as well as information specifying a spousal relationship type, and establishes a spousal relationship between the entities "Barack Obama" and "Michelle Obama" in the entity relationship model 120.

In some implementations, as shown in FIG. 1, entities can be represented by nodes 122, with edges 124 between the nodes 122 specifying relationships between the nodes 122. For example, a first node 122 may represent the entity "Barack Obama," a second node 122 may represent the entity "Michelle Obama," and a third node may represent the entity "Joe Biden." The nodes 122 representing the entities "Barack Obama" and "Joe Biden" may be related by an existing edge 124 that indicates a political relationship between the two entities. Based on the entity relationship model 120 receiving information specifying a spousal relationship between the entities "Barack Obama" and "Michelle Obama," the entity relationship model 120 is updated to include an edge 124 indicating a spousal relationship between the nodes 122 representing the entities "Barack Obama" and "Michelle Obama."

In some instances, the information received by the entity relationship model 120 may specify an entity that is not already represented by a node 122 in the entity relationship model 120. To establish a relationship between the specified entity and another entity that is already represented in the entity relationship model 120, the entity relationship model 120 may create or add a new node 122 to the entity relationship model 120 that represents the entity. The entity relationship model 120 may then establish a relationship between the newly created or added node 122 that represents the specified entity and one or more other nodes 122 that represent other entities in the entity relationship model 120.

While represented in FIG. 1 as a model including nodes 122 that represent entities and edges 124 representing relationships between those nodes 122, in other implementations the entity relationship model 120 can represent relationships between entities using different model types, or may utilize other methods of representing the relationships between entities. For example, the entity relationship model 120 may utilize a linked list data structure, a tabular data structure, an array or associative array data structure, a graph, tree, or other linked data structure, or any other data structure capable of specifying relationships having associated relationship types between different entities.

Figure 2A:
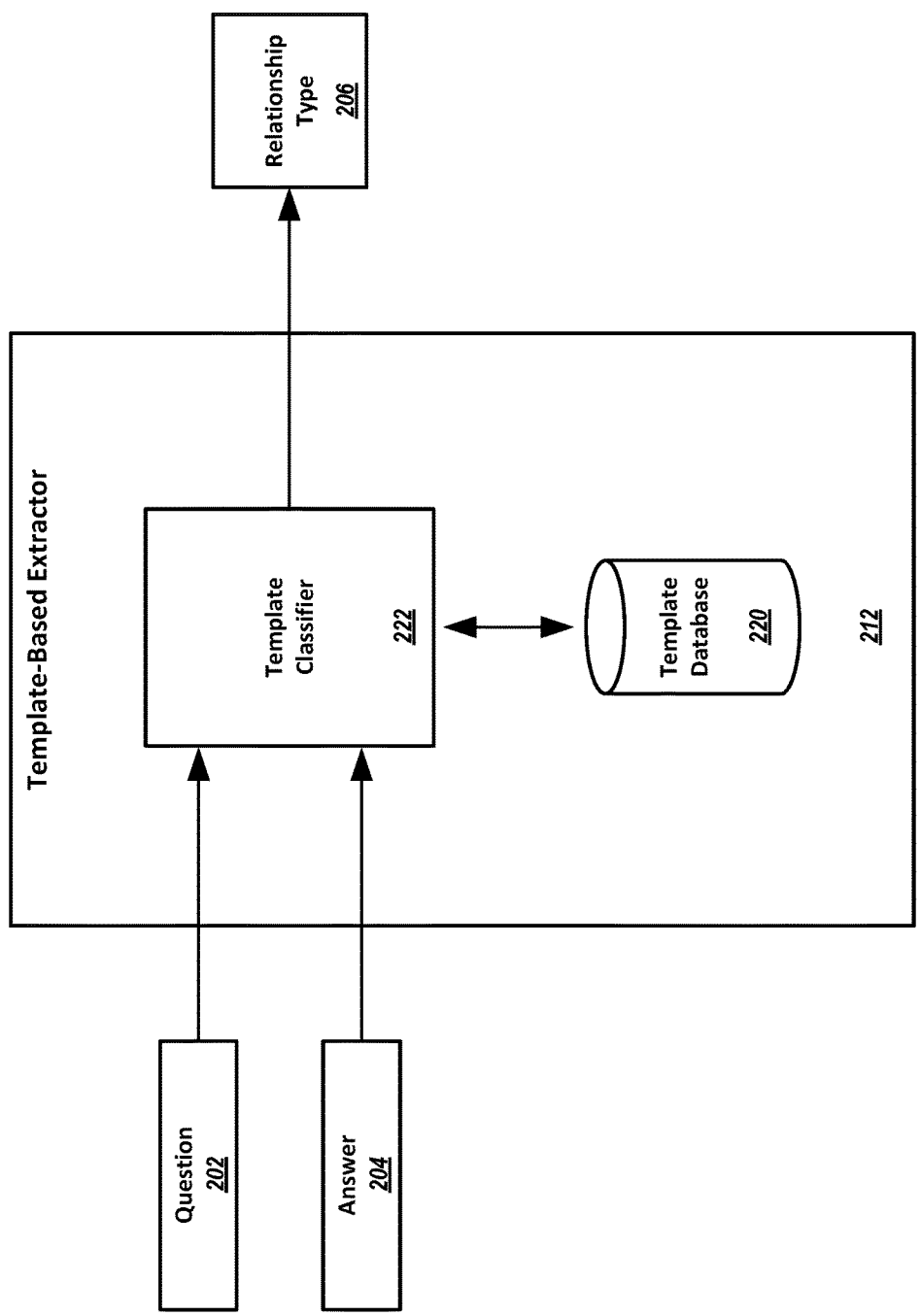
FIGS. 2A and 2B illustrate example systems for extracting relationship types from Q&A websites.
Figure 2B:
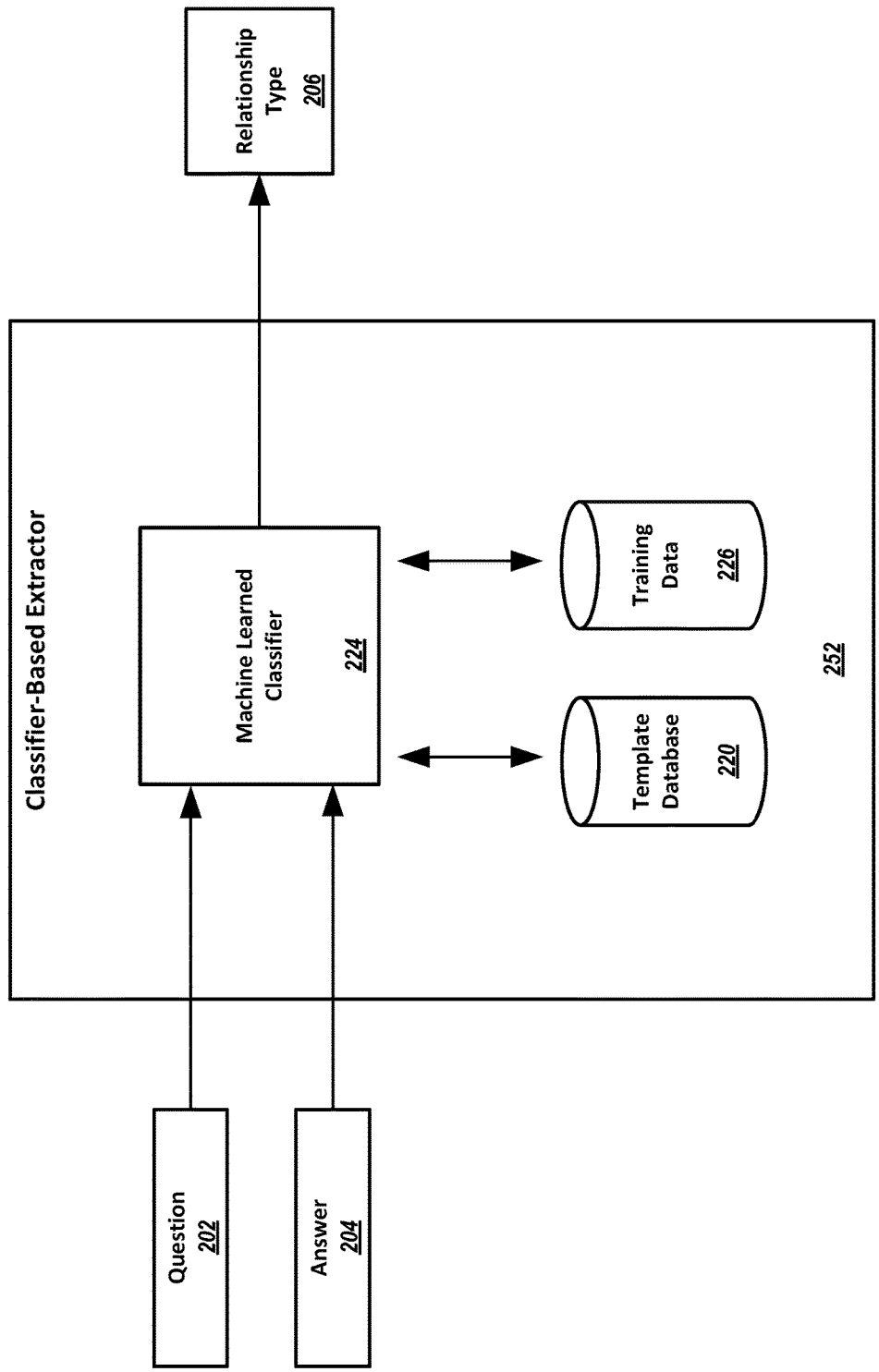

FIGS. 2A and 2B illustrate example systems for extracting a relationship type from question and/or answer text. For example, the functions of the relationship identifier 112 and/or the sentence parser 108 may be implemented by the systems depicted in FIG. 2A or 2B.

FIG. 2A illustrates a system that is capable of performing template-based extraction to determine a relationship type from question text and/or answer text. In some implementations, the system of FIG. 2A can include a template-based extractor 212 that determines a relationship type 206 based on received question text 202 and/or answer text 204. The template-based extractor 212 can include a template database 220 that includes one or more surface-based or parser-based templates that are accessible by a template classifier 222. The template classifier 222 compares the question text 202 and/or answer text 204 to one or more of the templates accessible at the template database 220 to determine the relationship type 206. The relationship type 206 may be used in specifying a candidate relationship between two entities, such that the candidate relationship of the relationship type 206 may be aggregated with other candidate relationships when determining a relationship between two particular entities.

The question text 202 and answer text 204 are portions of text that have been selected from resource content, such as text from a webpage of a Q&A website. For example, the question text 202 and answer text 204 can be selected by the Q&A classifier 106 of FIG. 1. In some implementations, the question text 202 and/or answer text 204 may be text that has not been annotated or may be text that has been annotated, for example, by the sentence parser 108 of FIG. 1.

Based on the template-based extractor 212 receiving question text 202 or answer text 204 that is not annotated, the template-based extractor 212 may access one or more surface-based templates at the template database 220 and compare the question text 202 and/or answer text 204 to the one or more surface-based templates. Alternatively, if the question text 202 and/or answer text 204 has been annotated, the template-based extractor 212 accesses one or more parser-based templates at the template database 220 and compares the question text 202 and/or answer text 204 to the one or more parser-based templates.

A surface-based template represents a question or answer that is associated with a particular relationship type using words in a particular order. For example, the template-based extractor 212 may compare the question text "Who is Barack Obama married to?" that has not been annotated to the surface-based template, "Who is [PERSON] married to?" that is associated with a spousal relationship type, and may determine that the question text matches the surface-based template associated with the spousal relationship type. Based on detecting the match between the question text and the surface-based template, the template-based extractor 212 can return a spousal relationship type as the relationship type 206.

Alternatively, a parser-based template is associated with a particular relationship type and uses annotated text that includes words or grammatical units in a particular order. For example, the template-based extractor 212 may receive the question text "Who is Barack Obama married to?" that has been annotated as, "WHO/pronoun IS/verb BARACK OBAMA/noun MARRIED/adjective TO/verb?" The template-based extractor 212 may compare the annotated question text to the parser-based template "[PERSON]/pronoun IS/verb [PERSON]/noun MARRIED/adjective TO/verb" that is associated with a spousal relationship type. Based on determining that the annotated question text matches the parser-based template associated with a spousal relationship type, the template-based extractor 212 can return a spousal relationship type as the relationship type 206.

In some implementations, a surface-based template or parser-based template includes one or more placeholders that are fillable by one or more terms of question text 202 or answer text 204. For example, the surface-based template "Who is [PERSON] married to?" includes a placeholder that may be filled by one or more terms of question text that correspond to an entity identified in the question text. Similarly, the parser-based template "[PERSON]/pronoun IS/verb [PERSON]/noun MARRIED/adjective TO/verb" includes two placeholders for a pronoun and an entity identified in the question text. One or more terms of question text 202 or answer text 204 may be classified as filling a placeholder in a template based on other terms in the question text 202 or answer text 204 matching the template, e.g., based on the terms "who," "is," "married," and "to" being in the proper order to match the surface-based template "Who is [PERSON] married to?"

In some implementations, determining that one or more particular terms of question or answer text fill a placeholder in a template comprises determining an entity class associated with one or more terms that might fill a placeholder, and determining whether the one or more terms that might fill the placeholder match a grammatical unit type and/or an entity class specified by the placeholder. For example, the template-based extractor 212 can determine that the terms "Barack Obama" might match the placeholder of the "person" entity class in the surface-based template "Who is [PERSON] married to?" and may access information indicating a grammatical unit and/or entity class associated with the terms "Barack Obama." Such information may be accessible by the template-based extractor 212, for example, at the entity identifier 110 of FIG. 1, or may be determined by the template-based extractor 212, for example, by comparing the terms "Barack Obama" to one or more entities that are represented in the entity relationship model 120 of FIG. 1.

In some examples, candidate terms to fill a placeholder in a template are compared only with entities of a particular entity class that is specified by the template. For example, based on the placeholder in the template "Who is [PERSON] married to?" specifying a "person" entity class, the terms "Barack Obama" that are identified as potentially filling the placeholder may be compared only to other entities of a "person" entity class and not to entities of other entity classes, e.g., entities of "place" or "thing" classes. Similarly, other terms in question text 202 or answer text 204 that are identified as potentially filling a placeholder in a template may be compared only to one or more acceptable terms for the particular placeholder in the template.

For example, based on determining that the term "Who" in the annotated question text "WHO/pronoun IS/verb BARACK OBAMA/noun MARRIED/adjective TO/verb?" may match the placeholder "[PERSON]/pronoun" in the parser-based template "[PERSON]/pronoun IS/verb [PERSON]/noun MARRIED/adjective TO/verb," the template-based extractor 212 may compare the term "Who" to a set of pronouns to determine whether the term "Who" satisfies the placeholder for the parser-based template. In some instances, each template may specify one or more terms that may fill a particular placeholder. For example, one parser-based template may specify that any pronoun may fill a "[PERSON]/pronoun" placeholder in the template, while another parser-based template may specify that only the pronouns "him," "her," or "them" may fill the placeholder.

In some implementations, the template classifier 222 ignores punctuation, capitalization, and/or certain terms that are designated as stop words when the comparing the question text 202 or answer text 204 to a surface-based template or parser-based template. For example, the template-based extractor 212 may receive the question text "Who is Barack Obama married to?" and may ignore the capitalization, punctuation, and the term "is" that is designated as a stop word. The template-based extractor 212 may consequently determine that the question text matches the surface-based template "who [PERSON] married to" based on ignoring the capitalization, punctuation, and designated stop words in the question text. Similarly, the question text "Who is Barack Obama married to?" may be determined as matching the parser-based template "[PERSON]/pronoun [PERSON]/noun MARRIED/adjective" based on ignoring punctuation, capitalization, and the designated stop words "is" and "to" in the parser-based template.

In some implementations, the template-based extractor 212 can return a target entity class in addition to the relationship type 206. For example, based on determining a spousal relationship type, the template-based extractor 212 can return information specifying a "person" entity class, such that entities identified from the question text 202 or answer text 204 are only selected if one, or both, of the entities are of the "person" entity class, e.g., not of a "place" or "thing" class. In some implementations, the information specifying the target entity class may be provided by the template-based extractor 212 to one or more components that identify and select potentially related entities from question text or answer text, for example, the entity identifier 110 of FIG. 1.

As discussed previously, in some instances, the template classifier 222 may compare only question text 202 to surface-based templates or parser-based templates to identify a match. Alternatively, the template classifier 222 may compare both question text 202 and answer text 204 to surface-based or parser-baser templates, where templates may be question templates that are compared only to question text 202 or may be answer templates that are compared only to answer text 204. In some instances, the template classifier 222 may determine matches between the question text 202 and a first template and between the answer text 204 and a second template, and may consider both matches in determining the relationship type 206.

In some implementations, training may be performed to identify templates that are to be stored at the template database 220 and used by the template-based extractor 212 to identify the relationship type 206. To determine useful relationships for a particular relationship type, distant supervision techniques may be employed. For example, distant supervision techniques may be employed to determine if a particular candidate template is a useful template for identifying a particular relationship type.

In some examples, known relationships between entities may be used in identifying useful templates for a particular relationship type. For example, the spousal relationship between the actor "Brad Pitt" and the actress "Angelina Jolie" may be used as a known spousal relationship in identifying templates that are likely associated with a spousal relationship type. Known relationships between entities may be determined, for example, from the entity relationship model 120 of FIG. 1 or from one or more other sources.

To identify a candidate template, one or more resources, such as one or more webpages of a Q&A website, are identified that include question text and answer text that identify the entities "Brad Pitt" and "Angelina Jolie." A candidate template for the spousal relationship type is determined from the question text identified from the resource. For example, based on determining that the question text "Who did Brad Pitt marry?" and the answer text "He married Angelina Jolie" identify the entities "Brad Pitt" and "Angelina Jolie," a candidate template for a spousal relationship can be determined, such as the candidate template, "Who did [PERSON] marry?" The process can be repeated for a number of different resources that identify the entities "Brad Pitt" and "Angelina Jolie" or other pairs of entities that are known to have a spousal relationship to generate a set of candidate templates for the spousal relationship type.

Each of these candidate templates can be associated with a count, indicating the number of times each candidate template has been detected in the resources, e.g., the number of other webpages from Q&A websites that have similar question and answer text and that mention entities that are known to have a particular relationship type. Templates that occur most frequently, or that are identified in connection with the most unique pairs of entities that are known to have the particular type of relationship, are selected as templates associated with the particular relationship type. In some implementations, candidate templates that satisfy a threshold number of occurrences, or that are identified in connection with a threshold number of unique pairs of entities that are known to have the particular type of relationship, are selected as templates associated with the particular relationship type.

FIG. 2B illustrates a system that is capable of performing classifier-based extraction to determine a relationship type based on question text. In some implementations, the system of FIG. 2B can include a classifier-based extractor 252 that determines a relationship type 206 based on received question text 202 and/or answer text 204. The classifier-based extractor 252 can include a template database 220 that includes one or more surface-based or parser-based templates that is accessible by a machine learned classifier 224, and can further include training data 226 that is also accessible by the machine learned classifier 224. The machine learned classifier 224 can analyze the question text 202 and/or answer text 204 to determine the relationship type 206. The relationship type 206 determined by the classifier-based extractor 252 can be used in specifying a candidate relationship between two entities.

Similar to FIG. 2A, the question text 202 and/or answer text 204 of FIG. 2B are portions of text that have been selected from a resource, such as a webpage of a Q&A website. The question text 202 and/or answer text 204 can be selected by, for example, the Q&A classifier 106 of FIG. 1, and in some implementations may be annotated question text 202 and answer text 204, for example, where the question text 202 and/or answer text 204 have been annotated by the sentence parser 108 of FIG. 1. Based on the classifier-based extractor 252 receiving the question text 202 and/or the answer text 204, the classifier-based extractor 252 can process the texts 202, 204 to identify the relationship type 206.

In some implementations, the classifier-based extractor 252 determines the relationship type 206 based on determining one or more different signals or information, and determining a probability that a particular relationship type exists based on the one or more determined signals or information. For example, the machine learned classifier 224 can receive the question text 202 and/or answer text 204, and can compare the question text 202 and/or answer text 204 to one or more surface-based templates and/or parser-based templates. If the question text 202 and/or answer text 204 is annotated text, the machine learned classifier 224 may compare the annotated text to one or more parser-based templates to determine whether a match exists, while if the question text 202 and/or answer text 204 is not annotated, the machine learned classifier 224 may compare the text that is not annotated to one or more surface-based templates to determine whether a match exists. The machine learned classifier 224 may determine which of the templates the question text 202 and/or answer text 204 matches, and may consider the match between a template and the question text 202 or answer text 204 when determining the probability of a particular relationship type being represented by the texts 202, 204.

As discussed previously, in some instances, the machine learned classifier 224 may compare only question text 202 to surface-based templates or parser-based templates to identify a match. Alternatively, the machine learned classifier 224 may compare both question text 202 and answer text 204 to surface-based or parser-baser templates, where templates may be question templates that are compared only to question text 202 or may be answer templates that are compared only to answer text 204. In some instances, the machine learned classifier 224 may determine matches between the question text 202 and a first template and between the answer text 204 and a second template, and may consider both matches in determining the relationship type 206.

In addition to considering whether a match exists between a particular template and the question text 202, the machine learned classifier 224 can consider additional signals in determining the probability that a particular Q&A resource specifies a particular type of relationship. For example, the machine learned classifier can consider the classes of entities determined from the question text 202 and/or answer text 204. These entity classes may be determined, for example, by the machine learned classifier 224, or may be determined by another component, such as the entity identifier 110 of FIG. 1.

Additionally or alternatively, the machine learned classifier 224 may determine a parse path between a HEAD token identified from the question text 202 to an entity identified from the question text 202, or may determine a parse bath between a HEAD token identified from the answer text 204 to an entity identified from the answer text 204. In such an implementation, the pairing of the HEAD token and the entity indicates the syntactic dependency of the identified entity on the HEAD token. In some instances, for example, the HEAD token of a portion of text may be a verb in the text, where the identified entity is the subject of the text or is otherwise related to the verb in the text. Other implementations relating to the determining of HEAD tokens and related entities for the question text 202 or answer text 204 may be used by the machine learned classifier 224.

In other implementations, other signals or information determined or accessed by the machine learned classifier 224 may be used to determine the probability of a particular type of relationship being identified from question text 202 or answer text 204. The machine learned classifier 224 may consider whether the entity identified from the question text 202, e.g., an entity identified from the question text 202 by the entity identifier 110 of FIG. 1, is also identified in the answer text 204. The machine learned classifier 224 may consider terms of the question text 202 or answer text 204 that appear adjacent to entities identified in the question text 202 or answer text 204. The machine learned classifier 224 may determine a similarity measure between the question text 202 and the answer text 204, and consider the similarity measure when determining the probability of a particular type of relationship being identified by the question text 202 and answer text 204. Other and/or different signals or information may be considered by the machine learned classifier 224 in determining the probability that a particular type of relationship is conveyed in the question text 202 and answer text 204.

Based on the signals and/or information considered, the machine learned classifier 224 can compute a confidence measure for one or more different relationship types that indicates the probability of a particular relationship type being conveyed by the question text 202 and/or answer text 204. For example, the machine learned classifier may determine a first confidence measure for a spousal relationship type, and a second confidence measure for a sibling relationship type.

The machine learned classifier 224 may select, as the relationship type 206 returned by the classifier-based extractor 252, the candidate relationship type having the highest confidence, or the candidate relationship type whose confidence satisfies a particular threshold. Overall, the processing performed by the classifier-based extractor 252 allows for a probabilistic determination of a type of relationship that is conveyed by question text 202 and/or answer text 204, which is unlike the binary match or failure to match determined by the template-based extractor 212.

The classifier-based extractor 252 can access the training data 226 to allow for training of the classifier-based extractor 252, thereby enabling the machine learned classifier 224 to more accurately predict relationship types from the question text 202 and/or answer text 204. Similar to the training process described with respect to the template-based extractor of FIG. 2A, training of the classifier-based extractor 252 can utilize distant supervision techniques. Samples of question text and answer text that are known to identify a particular relationship type are analyzed by the classifier-based extractor 252, and the method of determining the confidence measure for a particular type of relationship can be adjusted to increase the confidence measure for the relationship type that the entities are known to have.

For example, the classifier-based extractor 252 can access training data 226 that includes the question text "Who did Brad Pitt marry?" and answer text "He married Angelina Jolie." Based on this question and answer text, the classifier-based extractor 252 can change the signals or information considered in determining the confidence measure for the spousal relationship type, or weights applied to the signals or information considered in determining the confidence measure for the spousal relationship type.

These adjustments would result in the question and answer text relating to "Brad Pitt" and "Angelina Jolie" being assigned a higher confidence measure for a spousal relationship type, therefore increasing the probability that the question and answer text relating to "Brad Pitt" and "Angelina Jolie," and similar question and answer texts, would be identified as relating to a spousal relationship type. Similarly, this training could include changing the type of factors or information, or weights applied to certain factors or information, to reduce the chances that question and answer texts that identify a spousal relationship type are classified as identifying other relationship types.

Figure 3:
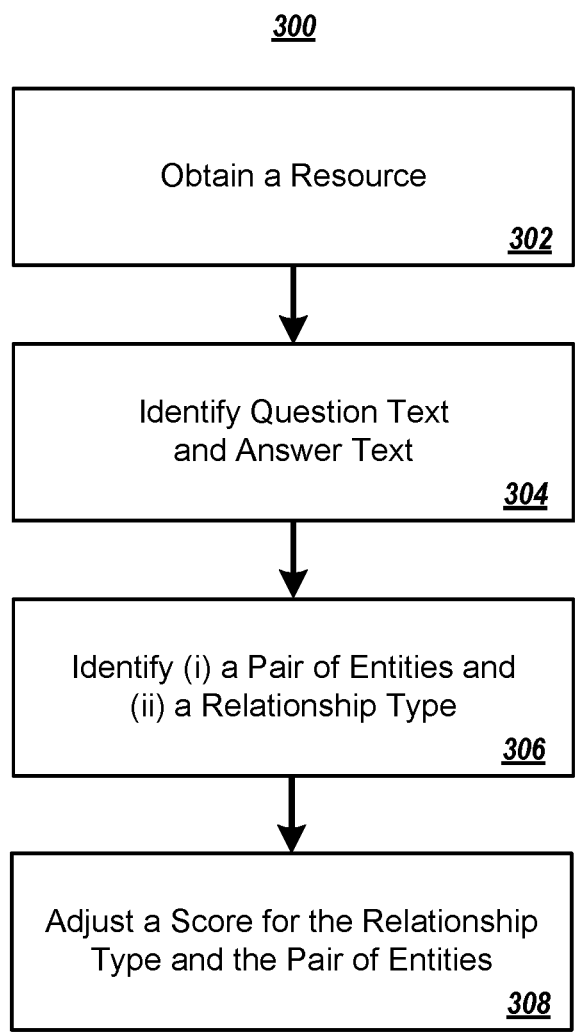
FIG. 3 depicts a flowchart of an example process for extracting entity relationships from Q&A websites.

FIG. 3 depicts a flowchart of an example process for extracting entity relationships from webpages of Q&A websites. In some implementations, the process 300 of FIG. 3 can be performed by the system 100 of FIG. 1.

At step 302, a resource is obtained. For example, the Q&A resource selector 104 of FIG. 1 can select a particular resource that is accessible at the Q&A resource database 102. In some implementations, as described, the obtained resource is a webpage or other resource of a Q&A website, such that the resource includes textual portions that correspond to a question and an answer to that question.

At step 304, a first portion of text of the resource that is characterized as a question and a second portion of text of the resource that is characterized as an answer to the question are identified from the content of the obtained resource. For example, the Q&A classifier 106 of FIG. 1 can access the obtained resource that was selected by the Q&A resource selector 104 from the Q&A resource database 102, and can process the resource to identify a portion of text in the resource that corresponds to a question and a portion of text in the resource that corresponds to an answer to that question.

In some instances, the resource is a webpage of a Q&A website, and the Q&A classifier 106 can process the webpage to identify text on the webpage that corresponds to a question and an answer. As described, a number of methods can be used to identify portions of text that correspond to either a question or answer in the obtained resource. For example, the obtained resource may be parsed or annotated, and question text or answer text may be identified based on identifying specific characters or character strings in the text of the resource, based on a detected sentence structure of particular portions of text, based on detecting repeating text in multiple textual portions of the webpage, or based on other methods.

At step 306, the first portion of text of the resource that is characterized as a question is analyzed to identify an entity that is referenced by one or more terms of the first portion of text and a relationship type that is referenced by one or more other terms of the first portion of text, and the second portion of text of the resource that is characterized as an answer to the question is analyzed to identify an entity that is referenced by one or more terms of the second portion of text. For example, the first portion of text of the resource that is characterized as the question can optionally be annotated by the sentence parser 108 of FIG. 1, and the annotated or non-annotated question text can be accessed by each of the relationship identifier 112 and the entity identifier 110 to identify both an entity from the first portion of text and a relationship type from the first portion of text. Similarly, the second portion of text that is characterized as the answer can optionally be annotated by the sentence parser 108 and analyzed by the entity identifier 110 of FIG. 1 to identify an entity from the answer portion of the text.

In some implementations, the first portion of text that is characterized as the question may be relied on for determining both a relationship type and the first of a pair of entities that might have the particular type of relationship. Identifying the relationship type solely from the first portion of text may expedite processing of the resource, without a considerable change in accuracy, since questions presented, e.g., at a webpage of a Q&A website, will typically need to explicitly state the type of relationship that a user is trying to determine. The same is not true for the second portion of text that is characterized as an answer to the question, since the answer to the question may not reference the type of relationship.

For example, while a relationship type may be determined from either the first portion of text or the second portion of text when the question recites "Who is Barack Obama married to?" and the answer recites "He is married to Michelle Obama," a relationship type may not be determined from the second portion of text that is characterized as the answer when the question recites, "Who is Barack Obama married to?" and the answer recites "Michelle Obama." Thus, relying solely on the first portion of the text that is characterized as the answer maintains reliability of the system in determining a relationship type, while also reducing the expenditure of resources needed to process the second portion of text that is characterized as the answer.

In some implementations, the system may perform processing on the second portion of text that is characterized as the answer if processing of the first portion of the text does not result in the identification of a relationship type, or does not result in a sufficiently confident determination of a relationship type. In some implementations, templates or methods used to identify a relationship type from question text may be different from the templates or methods used to identify a relationship type from answer text.

Having identified an entity from each of the first portion of text that is characterized as the question and the second portion of text that is characterized as the answer, and also identified a relationship type from the first portion of text, at step 308 a score associated with a relationship of the identified type between the two entities is adjusted. For example, based on the entity identifier 110 and relationship identifier 112 of FIG. 1 identifying a pair of entities and a relationship type, the aggregator 114 or relationship selector 118 of FIG. 1 may adjust a score associated with a candidate relationship of the determined type between the two entities. For example, based on processing a first portion of text that recites "Who is Barack Obama married to?" and a second portion of text that recites "Michelle Obama," the entities "Barack Obama" and "Michelle Obama" can be identified, and a spousal relationship type can also be identified. Based on these determinations, a score associated with a candidate spousal relationship between the entities "Barack Obama" and "Michelle Obama" can be adjusted to indicate an increased likelihood that the spousal relationship between "Barack Obama" and "Michelle Obama" is valid.

In some instances, adjusting the score for a particular relationship type between a pair of entities may also involve adjusting scores that are associated with other relationship types between the pair of entities or adjusting scores that are associated with other possible relationships of the identified relationship type between one of the identified entities and another entity. For example, based on identifying a spousal relationship between the entities "Barack Obama" and "Michelle Obama," a score associated with a spousal relationship between the entities "Barack Obama" and "Laura Bush," or a score associated with a sibling relationship between the entities "Barack Obama" and "Michelle Obama" can also be adjusted to indicate a reduced confidence that those relationships are valid.

The adjusted score or scores can subsequently be used in selecting a particular relationship of the identified relationship type for the entity identified from the first portion of text that corresponds to the question. For example, the relationship selector 118 of FIG. 1 can access candidate spousal relationships for the entity "Barack Obama" from the candidate relationships database 116. Such candidates may include, for example, a candidate spousal relationship between the entities "Barack Obama" and "Michelle Obama," and candidate spousal relationship between the entities "Barack Obama" and "Laura Bush," and a candidate spousal relationship between the entities "Barack Obama" and "Hillary Clinton." Each of the candidate spousal relationships can be associated with a score that indicates a probability or confidence that the particular candidate spousal relationship is a valid spousal relationship.

The relationship selector 118 of FIG. 1 can access the candidate spousal relationships for the entity "Barack Obama" and can select the candidate spousal relationship that is associated with the score indicating the highest confidence or probability of being a valid relationship. Based on the relationship selector 118 selecting a particular candidate relationship, such as the candidate spousal relationship between the entities "Barack Obama" and "Michelle Obama," an entity relationship model be modified to establish a spousal relationship between the entities "Barack Obama" and "Michelle Obama." For example, the relationship selector 118 can provide information to the entity relationship model 120 of FIG. 1 that causes an edge 124 corresponding to a spousal relationship to be established between the nodes 122 that correspond to the entities "Barack Obama" and "Michelle Obama."

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   obtaining a resource;
   identifying (i) a first portion of text of the resource that is characterized as a question, and (ii) a second portion of text of the resource that is characterized as an answer to the question;
   identifying, (i) an entity that is referenced by the first portion of text that is characterized as the question, and (ii) an entity that is referenced by the second portion of text that is characterized as the answer to the question;

determining, by a machine learned classifier, one or more candidate relationship types that are referenced by the first portion of text that is characterized as the question and the second portion of text that is characterized as the answer to the question, wherein each of the one or more candidate relationship types is associated with a respective probability, determined by the machine learned classifier, of the candidate relationship type being a proper relationship type between the entity that is referenced by the first portion of text that is characterized as the question and the entity that is referenced by the second portion of text that is characterized as the answer to the question;

selecting a particular relationship type from among the one or more candidate relationship types based at least on the one or more probabilities; and adjusting a score associated with a relationship of the particular relationship type for the entity that is referenced by the first portion of text that is characterized as the question and the entity that is referenced by the second portion of text that is characterized as the answer to the question.

2. The computer-implemented method of claim 1, wherein the resource is a question and answer (Q&A) website resource.

3. The computer-implemented method of claim 1, wherein determining the one or more candidate relationship types and the one or more probabilities comprises:
comparing the first portion of the text that is characterized as the question and one or more templates that are each associated with a respective relationship type; and
determining the one or more candidate relationship types and the one or more probabilities based at least on the comparison of the first portion of the text that is characterized as the question and the one or more templates that are each associated with a respective relationship type indicating a match with one or more particular templates.

4. The computer-implemented method of claim 3, wherein each of the one or more templates is one of a surface-based template or a parser-based template.

5. The computer-implemented method of claim 1, wherein determining the one or more candidate relationship types and the one or more probabilities comprises:
determining an entity class corresponding to the entity that is referenced by the first portion of the text that is characterized as the question and an entity class corresponding to the entity that is referenced by the second portion of the text that is characterized as the answer to the question; and
determining the one or more candidate relationship types and the one or more probabilities based at least on the entity class corresponding to the entity that is referenced by the first portion of the text that is characterized as the question and the entity class corresponding to the entity that is referenced by the second portion of the text that is characterized as the answer to the question.

6. The computer-implemented method of claim 1, wherein determining the one or more candidate relationship types and the one or more probabilities comprises:
determining a parse path from a head token identified from the first portion of the text that is characterized as the question to the entity that is referenced by the second portion of the text that is characterized as the answer to the question, wherein the parse path indicates a syntactic dependency between the head token and the entity that is referenced by the second portion of the text that is characterized as the answer to the question; and determining the one or more candidate relationship types and the one or more probabilities based at least on the parse path.

7. The computer-implemented method of claim 1, wherein determining the one or more candidate relationship types and the one or more probabilities comprises:
determining one or more first terms that are adjacent to one or more terms of the first portion of text that is characterized as the question that reference the entity that is referenced by the first portion of text that is characterized as the question;
determining one or more second terms that are adjacent to one or more terms of the second portion of text that is characterized as the answer to the question that reference the entity that is referenced by the second portion of text that is characterized as the answer to the question; and
determining the one or more candidate relationship types and the one or more probabilities based at least on the one or more first terms and the one or more second terms.

8. The computer-implemented method of claim 1, comprising:
aggregating the score associated with the relationship of the particular relationship type for the entity that is referenced by the first portion of text that is characterized as the question and the entity that is referenced by the second portion of text that is characterized as the answer to the question and one or more other scores that are each associated with a relationship of the particular relationship type for the entity that is referenced by the first portion of text that is characterized as the question and another entity;
comparing the score associated with the relationship of the particular relationship type for the entity that is referenced by the first portion of text that is characterized as the question and the entity that is referenced by the second portion of text that is characterized as the answer to the question and the one or more other scores that are each associated with a relationship of the particular relationship type for the entity that is referenced by the first portion of text that is characterized as the question and another entity; and
establishing, at an entity relationship model and based at least on the comparison, a relationship of the particular relationship type between the entity that is referenced by the first portion of text that is characterized as the question and the entity that is referenced by the second portion of text that is characterized as the answer to the question.

9. A system comprising:
one or more computers and one or more storage devices storing instructions that are operable, when executed by the one or more computers, to cause the one or more computers to perform operations comprising:
obtaining a resource;
identifying (i) a first portion of text of the resource that is characterized as a question, and (ii) a second portion of text of the resource that is characterized as an answer to the question;
identifying, (i) an entity that is referenced by the first portion of text that is characterized as the question, and (ii) an entity that is referenced by the second portion of text that is characterized as the answer to the question;

determining, by a machine learned classifier, one or more candidate relationship types that are referenced by the first portion of text that is characterized as the question and the second portion of text that is characterized as the answer to the question, wherein each of the one or more candidate relationship types is associated with a respective probability, determined by the machine learned classifier, of the candidate relationship type being a proper relationship type between the entity that is referenced by the first portion of text that is characterized as the question and the entity that is referenced by the second portion of text that is characterized as the answer to the question;

selecting a particular relationship type from among the one or more candidate relationship types based at least on the one or more probabilities; and adjusting a score associated with a relationship of the particular relationship type for the entity that is referenced by the first portion of text that is characterized as the question and the entity that is referenced by the second portion of text that is characterized as the answer to the question.

10. The system of claim 9, wherein the resource is a question and answer (Q&A) website resource.

11. The system of claim 9, wherein determining the one or more candidate relationship types and the one or more probabilities comprises:

comparing the first portion of the text that is characterized as the question and one or more templates that are each associated with a respective relationship type; and determining the one or more candidate relationship types and the one or more probabilities based at least on the comparison of the first portion of the text that is characterized as the question and the one or more templates that are each associated with a respective relationship type indicating a match with one or more particular templates.

12. The system of claim 9, wherein determining the one or more candidate relationship types and the one or more probabilities comprises:

determining an entity class corresponding to the entity that is referenced by the first portion of the text that is characterized as the question and an entity class corresponding to the entity that is referenced by the second portion of the text that is characterized as the answer to the question; and determining the one or more candidate relationship types and the one or more probabilities based at least on the entity class corresponding to the entity that is referenced by the first portion of the text that is characterized as the question and the entity class corresponding to the entity that is referenced by the second portion of the text that is characterized as the answer to the question.

13. The system of claim 9, wherein determining the one or more candidate relationship types and the one or more probabilities comprises:

determining a parse path from a head token identified from the first portion of the text that is characterized as the question to the entity that is referenced by the second portion of the text that is characterized as the answer to the question, wherein the parse path indicates a syntactic dependency between the head token and the entity that is referenced by the second portion of the text that is characterized as the answer to the question; and determining the one or more candidate relationship types and the one or more probabilities based at least on the parse path.

14. The system of claim 9, wherein determining the one or more candidate relationship types and the one or more probabilities comprises:

determining one or more first terms that are adjacent to one or more terms of the first portion of text that is characterized as the question that reference the entity that is referenced by the first portion of text that is characterized as the question;

determining one or more second terms that are adjacent to one or more terms of the second portion of text that is characterized as the answer to the question that reference the entity that is referenced by the second portion of text that is characterized as the answer to the question; and determining the one or more candidate relationship types and the one or more probabilities based at least on the one or more first terms and the one or more second terms.

15. The system of claim 9, wherein the operations comprise:

aggregating the score associated with the relationship of the particular relationship type for the entity that is referenced by the first portion of text that is characterized as the question and the entity that is referenced by the second portion of text that is characterized as the answer to the question and one or more other scores that are each associated with a relationship of the particular relationship type for the entity that is referenced by the first portion of text that is characterized as the question and another entity;

comparing the score associated with the relationship of the particular relationship type for the entity that is referenced by the first portion of text that is characterized as the question and the entity that is referenced by the second portion of text that is characterized as the answer to the question and the one or more other scores that are each associated with a relationship of the particular relationship type for the entity that is referenced by the first portion of text that is characterized as the question and another entity; and establishing, at an entity relationship model and based at least on the comparison, a relationship of the particular relationship type between the entity that is referenced by the first portion of text that is characterized as the question and the entity that is referenced by the second portion of text that is characterized as the answer to the question.

16. A non-transitory computer-readable storage device storing software comprising instructions executable by one or more computers which, upon such execution, cause the one or more computers to perform operations comprising:

obtaining a resource;

identifying (i) a first portion of text of the resource that is characterized as a question, and (ii) a second portion of text of the resource that is characterized as an answer to the question;

identifying, (i) an entity that is referenced by the first portion of text that is characterized as the question, and (ii) an entity that is referenced by the second portion of text that is characterized as the answer to the question;

determining, by a machine learned classifier, one or more candidate relationship types that are referenced by the first portion of text that is characterized as the question and the second portion of text that is characterized as the answer to the question, wherein each of the one or more candidate relationship types is associated with a respective probability, determined by the machine learned classifier, of the candidate relationship type being a proper relationship type between the entity that is referenced by the first portion of text that is characterized as the question and the entity that is referenced by the second portion of text that is characterized as the answer to the question;

selecting a particular relationship type from among the one or more candidate relationship types based at least on the one or more probabilities; and adjusting a score associated with a relationship of the particular relationship type for the entity that is referenced by the first portion of text that is characterized as the question and the entity that is referenced by the second portion of text that is characterized as the answer to the question.

17. The computer-readable storage device of claim 16, wherein the resource is a question and answer (Q&A) website resource.

18. The computer-readable storage device of claim 16, wherein determining the one or more candidate relationship types and the one or more probabilities comprises:

comparing the first portion of the text that is characterized as the question and one or more templates that are each associated with a respective relationship type; and determining the one or more candidate relationship types and the one or more probabilities based at least on the comparison of the first portion of the text that is characterized as the question and the one or more templates that are each associated with a respective relationship type indicating a match with one or more particular templates.

19. The computer-readable storage device of claim 16, wherein determining the one or more candidate relationship types and the one or more probabilities comprises:

determining an entity class corresponding to the entity that is referenced by the first portion of the text that is characterized as the question and an entity class corresponding to the entity that is referenced by the second portion of the text that is characterized as the answer to the question; and determining the one or more candidate relationship types and the one or more probabilities based at least on the entity class corresponding to the entity that is referenced by the first portion of the text that is characterized as the question and the entity class corresponding to the entity that is referenced by the second portion of the text that is characterized as the answer to the question.

20. The computer-readable storage device of claim 16, wherein determining the one or more candidate relationship types and the one or more probabilities comprises:

determining a parse path from a head token identified from the first portion of the text that is characterized as the question to the entity that is referenced by the second portion of the text that is characterized as the answer to the question, wherein the parse path indicates a syntactic dependency between the head token and the entity that is referenced by the second portion of the text that is characterized as the answer to the question; and determining the one or more candidate relationship types and the one or more probabilities based at least on the parse path.

* * * * *